United States Patent
Sturtevant et al.

(10) Patent No.: US 10,049,225 B2
(45) Date of Patent: *Aug. 14, 2018

(54) DATA ACCESS CONTROL SYSTEMS AND METHODS

(71) Applicant: Intellectual Ventures II LLC, Wilmington, DE (US)

(72) Inventors: Daniel Joseph Sturtevant, Cambridge, MA (US); Christopher Lalancette, Ayer, MA (US); Michael Nathan Lack, Arlington, VA (US); Paul B. Schneck, Potomac, MD (US)

(73) Assignee: INTELLECTUAL VENTURES II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,966

(22) Filed: Jul. 21, 2017

(65) Prior Publication Data

US 2018/0018472 A1 Jan. 18, 2018

Related U.S. Application Data

(63) Continuation of application No. 14/923,344, filed on Oct. 26, 2015, now Pat. No. 9,740,872, which is a
(Continued)

(51) Int. Cl.
 *G06F 21/62* (2013.01)
 *H04L 29/06* (2006.01)
 (Continued)

(52) U.S. Cl.
 CPC .............. *G06F 21/62* (2013.01); *G06F 21/31* (2013.01); *G06F 21/606* (2013.01);
 (Continued)

(58) Field of Classification Search
 None
 See application file for complete search history.

(56) References Cited

U.S. PATENT DOCUMENTS

| | | |
|---|---|---|
| 3,893,087 A | 7/1975 | Baker |
| 5,715,403 A | 2/1998 | Stefik |
| | (Continued) | |

FOREIGN PATENT DOCUMENTS

WO  WO2007140487  12/2007

OTHER PUBLICATIONS

International Bureau, International Preliminary Report on Patentability, PCT Application PCT/US2007/070244, dated Dec. 3, 2008, 4 pages.
(Continued)

*Primary Examiner* — Amir Mehrmanesh
(74) *Attorney, Agent, or Firm* — Perkins Coie LLP

(57) ABSTRACT

Various hardware and software configurations are described herein which provide improved security and control over protected data. In some embodiments, a computer includes a main motherboard card coupled to all input/output devices connected to the computer, and a trusted operating system operates on the main motherboard which includes an access control module for controlling access to the protected data in accordance with rules. The trusted operating system stores the protected data in an unprotected form only on the memory devices on the main motherboard. The computer may also have a computer card coupled to the main motherboard via a PCI bus, on which is operating a guest operating system session for handling requests for data from software applications on the computer. A tamper detection mechanism is provided in the computer for protecting against attempts to copy the unprotected form of the pro-
(Continued)

tected data onto memory devices other than the one or more memory devices used by the motherboard or computer card.

23 Claims, 13 Drawing Sheets

Related U.S. Application Data continuation of application No. 14/307,394, filed on Jun. 17, 2014, now Pat. No. 9,171,176, which is a continuation of application No. 11/756,824, filed on Jun. 1, 2007, now Pat. No. 8,800,008.

(60) Provisional application No. 60/803,683, filed on Jun. 1, 2006.

(51) Int. Cl.
*G06F 21/31* (2013.01)
*G06F 21/85* (2013.01)
*G06F 21/60* (2013.01)

(52) U.S. Cl.
CPC ...... *G06F 21/6209* (2013.01); *G06F 21/6218* (2013.01); *G06F 21/85* (2013.01); *H04L 63/0807* (2013.01)

(56) References Cited

U.S. PATENT DOCUMENTS

| | | | |
|---|---|---|---|
| 5,748,738 A | 5/1998 | Bisbee et al. | |
| 5,917,912 A | 6/1999 | Ginter et al. | |
| 5,933,498 A | 8/1999 | Schneck et al. | |
| RE39,621 E | 5/2007 | Kobayashi | |
| 7,613,847 B2 | 11/2009 | Kjos et al. | |
| 7,788,713 B2 | 8/2010 | Grobman et al. | |
| 7,890,769 B2 | 2/2011 | Chen et al. | |
| 8,800,008 B2 | 8/2014 | Sturtevant et al. | |
| 9,171,176 B2 | 10/2015 | Sturtevant et al. | |
| 9,740,872 B2 | 8/2017 | Sturtevant et al. | |
| 2003/0101322 A1 | 5/2003 | Gardner | |
| 2004/0230794 A1 | 11/2004 | England et al. | |
| 2006/0004837 A1 | 1/2006 | Genovker et al. | |
| 2006/0041761 A1 | 2/2006 | Neumann et al. | |
| 2006/0146057 A1 | 7/2006 | Blythe | |
| 2007/0043896 A1 | 2/2007 | Daruwala et al. | |

OTHER PUBLICATIONS

International Bureau, International Search Report, PCT Application PCT/US2007/070244, dated Apr. 1, 2008, 2 pages.
International Bureau, Written Opinion of the International Searching Authority, PCT Application PCT/US2007/070244, dated Apr. 1, 2008, 3 pages.
Ohzone et al., "Random Access Memories," in ISSCC 80, IEEE International Conference, Feb. 15, 1980, pp. 236-237.
United States Patent and Trademark Office, Advisory Action, U.S. Appl. No. 11/756,824, dated Oct. 25, 2012, 3 pages.
United States Patent and Trademark Office, Final Office Action, U.S. Appl. No. 11/756,824, dated Jul. 5, 2013, 27 pages.
United States Patent and Trademark Office, Final Office Action, U.S. Appl. No. 11/756,824, dated Jun. 7, 2012, 24 pages.
United States Patent and Trademark Office, Final Office Action, U.S. Appl. No. 11/756,824, dated Sep. 9, 2010, 17 pages.
United States Patent and Trademark Office, Non-Final Office Action, U.S. Appl. No. 11/756,824, dated Dec. 24, 2012, 28 pages.
United States Patent and Trademark Office, Non-Final Office Action, U.S. Appl. No. 11/756,824, dated Sep. 1, 2011, 18 pages.
United States Patent and Trademark Office, Non-Final Office Action, U.S. Appl. No. 11/756,824, dated Mar. 30, 2010, 12 pages.
United States Patent and Trademark Office, Non-Final Office Action, U.S. Appl. No. 14/307,394, dated Nov. 20, 2014, 18 pages.
United States Patent and Trademark Office, Non-Final Office Action, U.S. Appl. No. 14/923,344, dated Nov. 4, 2016, 15 pages.
United States Patent and Trademark Office, Notice of Allowance, U.S. Appl. No. 11/756,824, dated Mar. 17, 2014, 11 pages.
United States Patent and Trademark Office, Notice of Allowance, U.S. Appl. No. 14/307,394, dated Jun. 22, 2015, 13 pages.
United States Patent and Trademark Office, Notice of Allowance, U.S. Appl. No. 14/923,344, dated Apr. 20, 2017, 9 pages.

DATA ACCESS CONTROL SYSTEMS AND METHODS

CROSS-REFERENCE TO RELATED APPLICATIONS

This application is a continuation of U.S. patent application Ser. No. 14/923,344, filed Oct. 26, 2015 (U.S. Pat. No. 9,740,872), which is a continuation of U.S. patent application Ser. No. 14/307,394, filed Jun. 17, 2014 (U.S. Pat. No. 9,171,176), which is a continuation of U.S. patent application Ser. No. 11/756,824, filed Jun. 1, 2007 (U.S. Pat. No. 8,800,008), which claims the benefit of provisional patent application No. 60/803,683, entitled "DATA ACCESS CONTROL," filed Jun. 1, 2006, which are hereby incorporated by reference in their entireties.

FIELD OF INVENTION

The invention relates to methods and devices for controlling access to data.

BACKGROUND OF THE INVENTION

A computer system and associated methods and devices for distributing protected data and controlling access to and use of such data in accordance with rules are disclosed, for example, in U.S. Pat. No. 5,933,498 to Schneck et al. entitled "System for Controlling Access and Distribution of Digital Property," which issued on Aug. 3, 1999, the entire contents of which patent are incorporated herein by reference.

The ongoing advancement of computer hardware and software technologies, and the widespread use of networks such as the internet to distribute content in digital form, necessitate continued improvements in technologies for protecting digital content during distribution and use. The present inventions provide various improved configurations of hardware and/or software for controlling access to protected digital content.

SUMMARY OF THE INVENTION

Various hardware and software configurations are described herein which provide improved security and control over protected data. In some embodiments, a computer or computing system including multiple computers is provided. The computer includes a main motherboard card, having one or more first processors and one or more first memory devices such as RAM, being coupled to all input/output devices connected to the computer to input data into the computer or output data from the computer, such as hard or optical disk drives, USB ports, or network interfaces. A trusted operating system is programmed to operate on the main motherboard, and includes an access control module for controlling access to the protected data in accordance with one or more rules. The rules may be specified in tickets received from a ticket server. The trusted operating system stores the protected data in an unprotected form, for example, when it has been decrypted, only on the first memory devices on the main motherboard.

In accordance with some embodiments, the computer may also have a computer card, having one or more second processors and one or more second memory devices, which is coupled to the main motherboard via a PCI bus. One or more guest operating system sessions may be running on the one or more computer cards for handling requests for data from one or more software applications on the computer. The software applications are usable to access and process the protected data in its unprotected form.

In some embodiments, a tamper detection mechanism is provided in the computer for protecting against attempts to copy the unprotected form of the protected data onto memory devices other than the one or more first or second memory devices. The tamper detection mechanism may further disable any further access to the protected data in its unprotected form by, for example, deleting any decryption keys used to decrypt and thus unprotect the protected data.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form apart hereof, and in which is shown by way of illustration specific embodiments in which the invention may be practiced. It is to be understood that other embodiments may be utilized and structural changes may be made without departing from the scope of the present invention.

Figure 1:
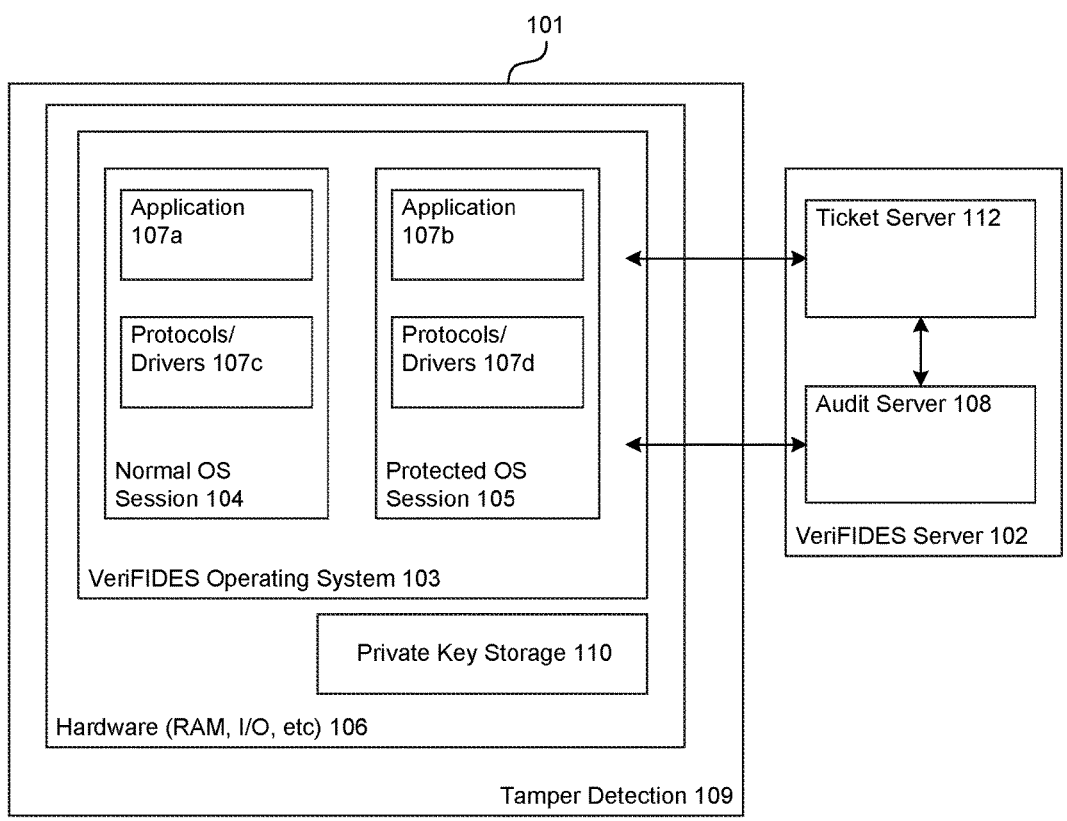
FIG. 1 presents an exemplary embodiment of an architecture of a VeriFIDES client/server system.

FIG. 1 illustrates an embodiment of an architecture of a client/server system according to the invention, which system shall be referred to herein as VeriFIDES™ in its various embodiments described herein. As illustrated in FIG. 1, the VeriFIDES client/server architecture includes a VeriFIDES machine 101 and a VeriFIDES server 102. Within the VeriFIDES machine 101, a VeriFIDES operating system 103 runs separately from a plurality of user operating systems 104 and 105 running on the VeriFIDES machine 101. The VeriFIDES operating system 103 may contain an access control mechanism comprising a small footprint software component that executes on trusted hardware 106 underneath operating systems 104 and 105, as described further below.

The user operating systems 104 and 105 are the operating systems that control user interactions with the machine and which receive requests from the user to access information stored in the machine or elsewhere. In a preferred embodiment the VeriFIDES system never trusts operating systems 104 and 105. As a result, applications 107a-b, protocols/drivers 107c-d, and even the kernels themselves resident within the operating systems 104 and 105 may be compromised without loss of the security of the system. The compromise of applications, protocols, drivers or the kernels resident within the operating systems may lead to a denial of service, but a denial of service is preferable to leaking information.

The kernels for the user operating systems 104 and 105 and VeriFIDES operating system 103, although not illustrated, are resident within the operating systems operating between applications and hardware, or perceived hardware. The structure of an operating system is commonly understood in the art.

All input and output in the system comes from the access control mechanism resident in the VeriFIDES operating system 103. Input and output may include network, USB, CD-ROM and floppy traffic via the trusted hardware 106. This ensures that before any data ever makes it into the hands of the user, the VeriFIDES system has had time to examine it and to make decisions about whether this user has the right to see this information.

Sensitive information is protected by encryption. Data is always encrypted until it gets into the memory on the user's operating system 104 or 105. This ensures that even if hard drives are lost, or data given to rogue users, the data cannot be examined unless access was specifically granted to that user. The VeriFIDES operating system 103 may encrypt data via any encryption means known in the art such as RSA, DSA, IDEA, etc.

Access to information is controlled through tickets. A ticket generally grants the user the right to access protected content protected by the VeriFIDES system. A ticket consists of the content decryption key and a set of access rights authorized for the end-user. In a preferred embodiment, particular permissions to that user may include how long they can see the document, whether or not they can print or perform other operations on the document, etc. This is how originator control is retained; the originator only grants the permissions that he or she wishes to. The use of tickets lets the originator pre-stage data; in particular, they may send out the document ahead of time, and then grant permissions to individuals as they require it. The concept of tickets is described more fully with respect to FIG. 8.

A VeriFIDES server 102 contains a ticket server 112 responsible for maintaining a list of the known VeriFIDES enabled computers, a list of protected data and their associated encryption keys. In addition, the ticket servers maintain the associations between access rights and protected content.

A VeriFIDES server 102 is further responsible for all of the administration of the (possibly many) VeriFIDES machines 101 it is in charge of. This includes granting tickets, revoking tickets, looking at access patterns, etc. A VeriFIDES server 102 has a working knowledge of what is going on with all of the machines it is in charge of, generally through the a plurality of audit logs.

Audit logs are located within and processed by the audit server 108. All actions on any VeriFIDES machine 101 are logged and sent over to the VeriFIDES audit server 108. These logs can then be viewed by the originator or administrator, and appropriate actions can be taken, such as revocation of tickets, disciplinary action, etc.

In one aspect, an application of the audit and logging functionality of the VeriFIDES server 102 is provided that can be used to drastically reduce the scope of questionable data in the event of a compromise. In another aspect, a modification to the way in which VeriFIDES processes tickets is provided that allows for 'state-based' access control over data.

Other audit and logging tools of the prior art can perform similar functions for narrowing the sphere of compromise. Technologies such as Apple's iPod perform 'state-based' access control. However, such other tools cannot guarantee the integrity or fidelity of their audit logs. Also, Apple's iPod only works on specific data formats and platforms.

In accordance with the present invention, to limit the sphere of compromise, the VeriFIDES audit logs indicate what particular files/data a user had a ticket for. Additionally, since all I/O in the computer goes through VeriFIDES, the logs indicate when and how particular files are accessed. Finally, since the logs are being generated beneath (and thus unaware of by) the operating system, much greater guarantees about the integrity of the logs can be provided. Thus, in the event of compromise, it is possible to know exactly what files a particular user had tickets or decryption keys for, when those files were accessed, and what type of access (view, copy, print, etc.) occurred.

In one embodiment, the VeriFIDES system involves running multiple instances of an operating system 104 and 105, such as Windows, (called the "guests") on a non-persistent disk in VMWare on Linux 103 (called the "host"). All of the VeriFIDES logic, decision making, and access control happens on the host, so that the user doesn't have any influence over these parameters. All of the services that the guests may need are served up through the host, including, but not limited to: NTP, DNS, USB connectivity, CDROM I/O, CD burning, hard drive, email, and internet/web. Embodiments utilizing multiple operating system sessions are described more fully with respect to FIGS. 10-11.

Returning to FIG. 1, the access control daemon, which is the heart of the VeriFIDES operating system 103, is a process that continually runs on the host system. All processes running on guest operating systems 104-105 come to access control to find out if they are allowed to do what they are currently doing, and if so, how to decrypt that data. Both of the preceding decisions are based on the tickets currently open and/or the tickets available to be opened. Without a ticket, access control will not allow any process to decrypt data from disk. With a proper ticket, however, access control will give the requesting process the key to decrypt the data, and that process will then go and decrypt it.

Figure 8:
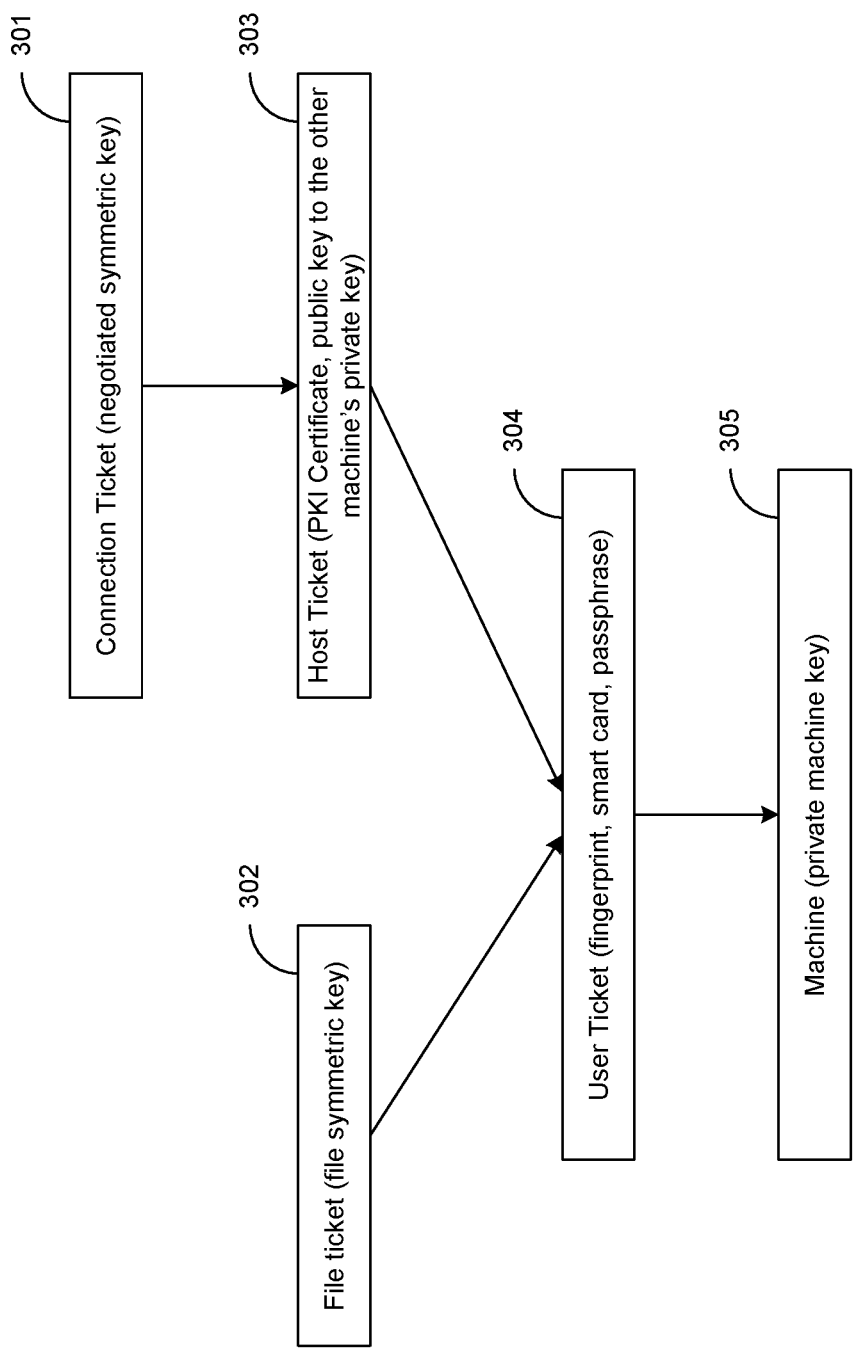
FIG. 8 presents a taxonomy of ticket types on a machine.

FIG. 8 presents a taxonomy of ticket types on a machine. In a preferred embodiment of the present invention, there are 2 classes of tickets: AUTHENTICATION and DATA. In addition, there are 4 types of tickets: user 304, file 302, host 303, and connection 301. In particular, AUTHENTICATION TICKETS may be user and host, while DATA TICKETS may be file and connection. Authentication tickets may allow users and other machines to authenticate themselves with the VeriFIDES machine. Data tickets may control access to protected content.

User Tickets 304 may define a user on the machine. They may contain a username and a domain that specify the user's identity. They also may contain userKey fields in the authentication section which will be compared against the data the user provides during authentication. These userKeys would contain a hash of a passphrase, a secret number in a smartcard, characteristics of a fingerprint, etc. User tickets 304 may also contain permissions indicating the usage restrictions for that user irregardless of any data accessed.

File Tickets 302 may be bound to a protected file or set of protected files. They may contain the symmetric key needed to decrypt the file. This type is used not only for files, but also for static web pages and emails. They may contain a permissions section which restricts the state of the session after the file has been accessed.

Host Tickets 303 are a special case in that they do not directly enable communication for the user. They may contain the public key of other VeriFIDES machines that this machine may want to talk to. This serves as a Public Key Infrastructure. This ticket is required to allow access control to communicate with other machines while sending audit logs, requesting tickets, or negotiating network connections with other VeriFIDES machines or gateways on behalf of the user of the guest machine. This ticket lacks information regarding authentication or permissions because it is used by access control rather than the user on the guest machine. A machine must be pre-staged with at least one Host ticket. This will be the host ticket of its trusted Ticket Server.

Connection Tickets 301 may define a connection that a guest machine can make to another VeriFIDES machine or gateway. Connection tickets 301 may contain a symmetric key to encrypt network traffic using that connection. In some embodiments, connection tickets 301 may not contain a key because the key may be negotiated with the other host by access control. The connection tickets 304 may define the machine, other machine, port, server vs. client access, and service that can be accessed. Wildcards may be used to allow this connection ticket to apply to any port or to allow it to apply to communication initiated by either end.

Each ticket contains a binding which is used to associate the ticket with a piece of protected data it is intended to grant access to. In a preferred embodiment, a ticket will contain a binding that will also be found in the footer of a protected file. VeriFIDES compares the binding in the file with the bindings in tickets to determine which ticket to decrypt the file with.

In any session, the set of open bindings defines the "context" of that session. This "context" describes who is accessing what protected data. This context will be used to support derivative works.

Tickets will also describe "permissions" that will be used to restrict the use of the data protected by that ticket. Each session will maintain an intersection of the permissions of all its open tickets/bindings. For example, accessed data is protected by Ticket A and Ticket B. Ticket A's permissions require that your external media be read only. Ticket B's permissions shut off printing and require the session to end at 5:00 PM. The session is now in a state that combines all those restrictions.

The ticket identifier tells access control what and who this ticket is meant to be used for. It is one of the few fields that is dynamic depending on the ticket type. Tickets will either specify a user or use a wildcard that allows use by any user with the ability to log into the machine.

Tickets will only be able to be used to open documents while in a session at a specified classification level unless the ticket contains a wildcard that indicates that the ticket can be used to access data within any protected session on that machine.

The authentication methods of a ticket higher in FIG. 8 override the methods specified by ticket lower in FIG. 8 if they are more restrictive. For example, a user ticket may contain keys for fingerprint, smartcard, and passphrase but only require the passphrase for user login. A file ticket may require fingerprint authentication. The system would ask the user for a fingerprint when the user tried to access the file. In addition a higher level ticket may override the userKey required. A specific file might require a different smartcard than the one the user authenticated with or require a different password.

Appendix A at the end of this specification, and forming part hereof, contains a sample file structure for an XML file for storing and delivering tickets in accordance with embodiments of the present invention.

Returning to FIG. 1, in embodiments of the present invention, the VeriFIDES system incorporates hardware tamper detection/reaction 109, the scaled-down trusted Linux containing the VeriFIDES operating system 103 running on the main hardware, and the VeriFIDES access control mechanism running within the VeriFIDES operating system. The embodiment of FIG. 1 may be modified by adding an additional single board computer card containing the guest operating systems 104-105 and applications 107a-d. The VeriFIDES operating system may remain resident on a main motherboard, separate but communicatively coupled to the single board computer card via a bus such as a PCI bus. In the discussion of this embodiment, references to the operating system are, unless otherwise specified, references to the guest sessions executing on the single board computer card, and references to the computer's RAM refer, unless otherwise specified, to RAM both on the motherboard and on the single board computer card.

All access control and encryption/decryption logic exists in the VeriFIDES operating system 103 (at least one user operating system 104-105) and is thus invisible to both the user operating system 104-105 and all application software 107a-b and protocols/drivers 107c-d. The VeriFIDES system operates at a level akin to a virtual machine from the perspective of the guest sessions 104-105, in that the guest sessions 104-105 are only aware of the hardware on the single board computer card and motherboard hardware that the VeriFIDES operating system 103 makes visible. Given that, the VeriFIDES system is transparent to the guest sessions 104-105 and applications 107a-b and protocols/drivers 107c-d running within them.

Protected data exist in decrypted form only in the RAM resident in the trusted motherboard hardware 106 of the VeriFIDES protected computers 101. Data are encrypted when at rest and while in transit. When an application in a guest session 104-105 attempts to access data, if the user is allowed to access that data, the VeriFIDES operating system 103 will decrypt that data inside the RAM on the motherboard, and then 'serve' the data up to the guest session via the PCI bus.

This decrypted data will exist in the RAM on the single board computer card as well, making them accessible to the guest sessions 104-105 and applications 104-105 running within the guest sessions 104-105. Thus, protected data exist in decrypted form only in the RAM and PCI bus of both the motherboard and the single board computer card.

Hardware tamper-detection 109 protects against attempts to copy the decrypted data from the system's RAM 106 or to load malicious software onto the VeriFIDES operating system 103. Given that the VeriFIDES operating system 103 resides at a level inaccessible to the guest sessions 104-105, it is secure from software attacks launched within these sessions, as will be described later. Thus, the only way to get information out of the machine would be via some sort of hardware-based attack such as probing the RAM or PCI bus on either the motherboard or the single board computer card.

In the architecture presented in FIG. 1, the entire contents of the computer's case would need to be protected, preventing probing of either PCI bus or RAM banks. VeriFIDES supports interaction with hardware tamper detection/reaction 109, but does not necessarily specify what type/strength of detection should be employed. Upon tamper detection, VeriFIDES can immediately zeroize the private key stored within private key storage 110, preventing the decryption of tickets, which in turn, prevents the decryption of protected data.

Data cannot leave a VeriFIDES protected operating system session 104-105 without being encrypted, unless the document originator gave specific permission to do so. All data leaving a guest session 104-105 executing on the single board computer card are intercepted by VeriFIDES access control 103 before they reach the computer's hardware 106 (hard disk, USB bus, network interface, CDRW drive, etc.). Permissions within a ticket specify what to do with this data. VeriFIDES access control 103 might encrypt the data with a specific symmetric key, prevent the data from reaching the hardware (providing a read-only capability), or, in special cases, allow the data to be written out un-encrypted.

All tickets are encrypted with a statistically-unique public/private key pair to prevent access to the data encryption key. Each VeriFIDES PC has a private key embedded in the hardware 110. Tickets are encrypted with the corresponding public key, ensuring that only the recipient host machine is able to decrypt the ticket. This mechanism relies on a public key infrastructure. The cryptographic plug-in architecture of VeriFIDES system allows it to work with virtually any PKI technology.

The VeriFIDES system private key is stored in hardware 110 under the operating system, protected by tamper-detection/erasure circuitry 109, and thus is not accessible to the operating system 104-105, application software 107a-b or the end user, or a hacker.

As mentioned above, the guest sessions only have access to hardware exported by the VeriFIDES operating system 103. Thus, the private key is hidden and protected from the guest sessions. Because protection of this private key is critical to VeriFIDES security, tamper detection/reaction 109 can be employed in situations where physical attacks on the machine are a concern.

The data encryption key (protected by the encryption ticket) is only decrypted and visible in the VeriFIDES access control mechanism 103 and therefore cannot be used by the operating system, application software or the end user.

Figure 10:
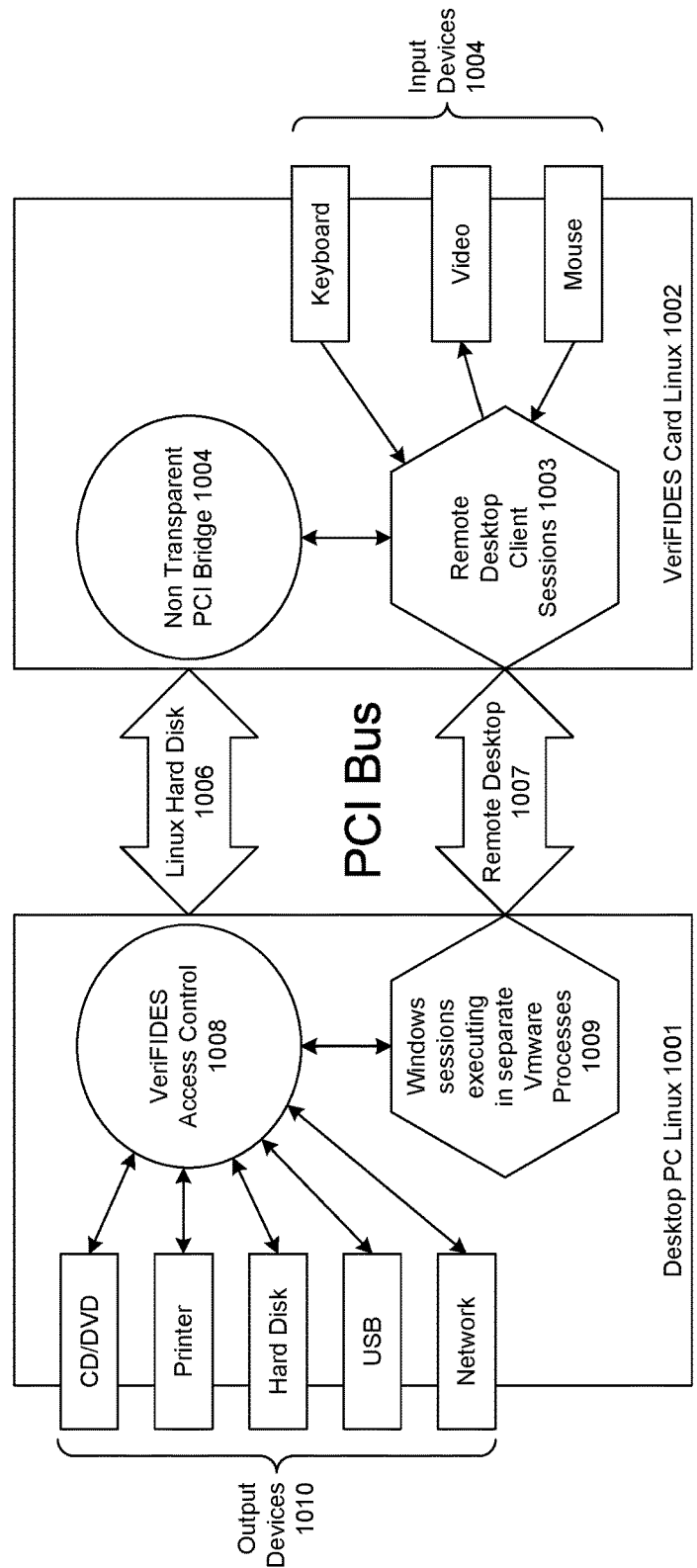
FIG. 10 illustrates an alternative embodiment utilizing a remote desktop design for implementing the VeriFIDES system.
Figure 11:
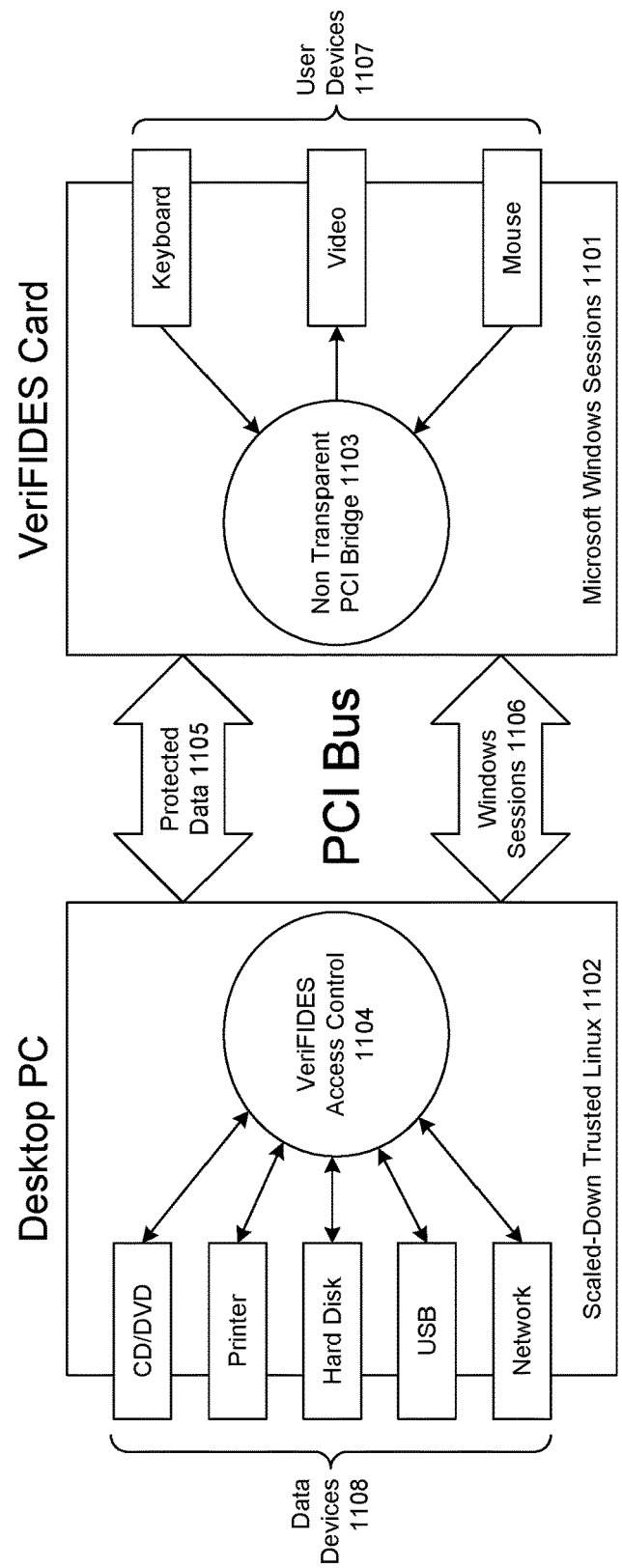
FIG. 11 provides an alternative embodiment for providing session connections to the VeriFIDES enabled PC.

An embodiment of a single board card interacting with a motherboard card is described more with respect to FIGS. 10-11.

Figure 2:
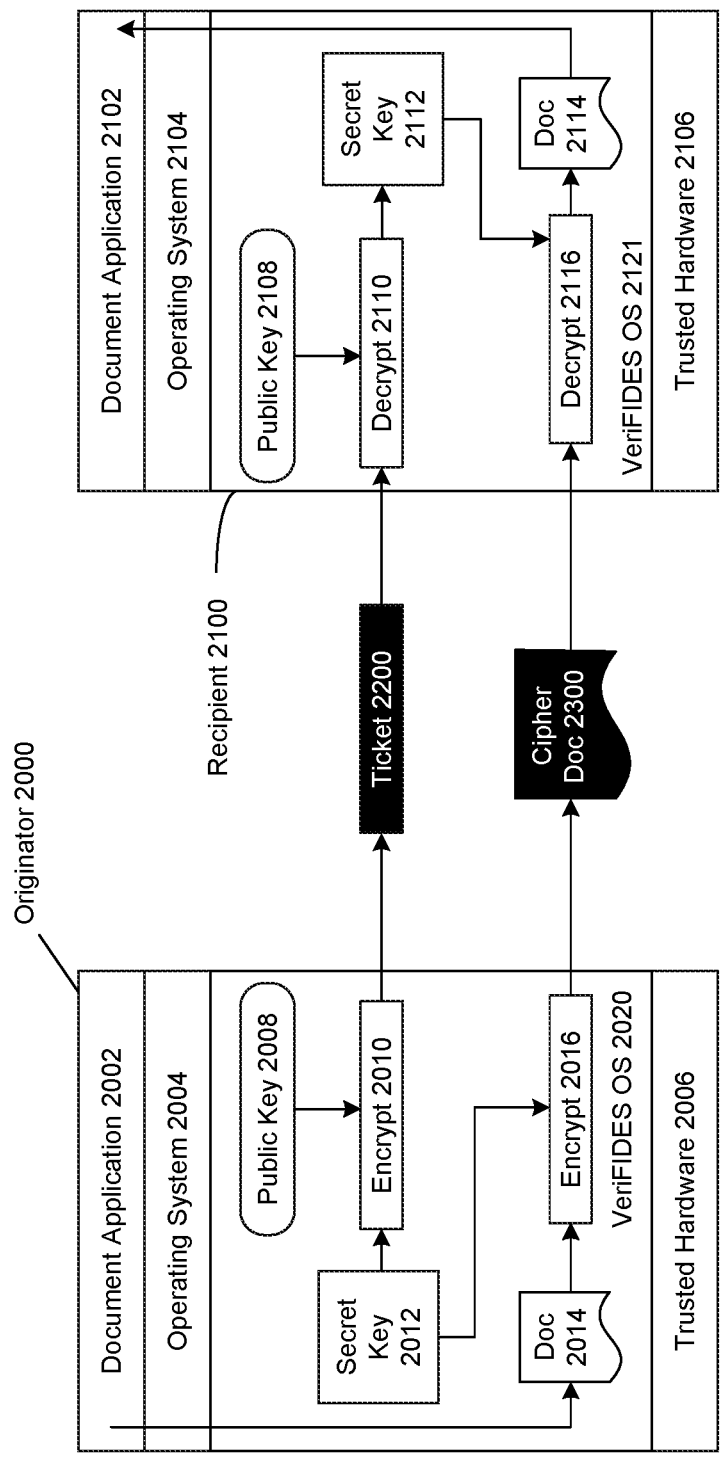
FIG. 2 presents a preferred embodiment of an originator/recipient architecture implementing the VeriFIDES system.

FIG. 2 illustrates a preferred embodiment of an originator/recipient architecture implementing the VeriFIDES system. As illustrated, an originator 2000 comprises at least one document application 2002, an operating system 2004, a VeriFIDES OS 2020 and trusted hardware 2006. The VeriFIDES OS 2020 further comprises a public key 2008, an encryption mechanism 2010, a secret key 2012, a secondary encryption mechanism 2016 and an original document 2014.

The VeriFIDES OS 2020 is operable to first encrypt a secret key 2012 via encryption mechanism 2010. This encrypted secret key is stored as a ticket allowing access to content protected by the originator. The secret key 2012 is also operable to encrypt a document 2014 via encryption mechanism 2016.

The generated ticket 2200 and cipher document 2300 are transmitted to a recipient machine 2100 containing an architecture similar to the originator machine 2000. As illustrated, a recipient machine 2100 comprises a document application 2102, an operating system 2104, a VeriFIDES operating system 2121 and trusted hardware 2106.

Upon receipt of the encrypted ticket 2200 and cipher doc 2300, the VeriFIDES OS 2121 is operable to decrypt the ticket 2200 with the same public key 2108 via decryption mechanism 2110. VeriFIDES OS 2121 is also operable to decrypt cipher doc 2300 via secret key 2112 through decryption mechanism 2116. The resulting document 2114 is provided to the user via operating system 2104 and document application 2102.

As mentioned above, the VeriFIDES operating system (including access control and encryption/decryption) exist at a level transparent to the guest sessions. Thus, the data encryption keys (which are stored in encrypted tickets) only exist in decrypted form in the RAM on the main motherboard. The RAM on the single board computer card never contains these keys.

In an alternative embodiment and as another layer of protection, a SunPCi card may be used in the system and running another version of Linux, which is then used to rdesktop into the guest. The user only ever interacts with this rdesktop session. Therefore, even if the user were malicious and attempted to break out of the rdesktop session, they would have two layers to get through to get to sensitive information; from rdesktop to the Linux on the card, and then from Linux on the card to Linux on the host. This provides a good layer of security.

FIG. 10 illustrates an alternative embodiment utilizing a remote desktop design for implementing the VeriFIDES system. As illustrated, a desktop PC running a version of Linux 1001 comprises a VeriFIDES access control module 1008, a plurality of Windows sessions executing in separate VMware processes 1009 and a plurality of output devices 1010. The desktop PC 1001 is communicatively coupled to a VeriFIDES card running another instance of Linux 1002. The VeriFIDES card comprises a non-transparent PCI bridge 1004, a plurality of remote desktop client sessions 1003 and a plurality of input devices 1004. As illustrated, the remote desktop sessions 1003 are coupled to the desktop PC 1001 via remote desktop connection 1007 over the PCI bus. Furthermore, the non-transparent PCI bridge 1004 is connected to the VeriFIDES access control mechanism 1006 via the Linux hard disk 1006 and PCI bus.

A plurality of users may access the desktop PC via the remote sessions 1003. The VeriFIDES access control 1008 monitors the usage of users utilizing the desktop PC to ensure that malicious attempts are prevented as previous discussed. User input and output is routed from the remote sessions 1003 through the non-transparent PCI bridge 1004. Subsequently, any user input is routed from the non-transparent PCI bridge 1004 to the VeriFIDES access control 1008, thus eliminating the threat of misuse during input/output operations.

FIG. 11 provides an alternative embodiment for providing session connections to the VeriFIDES enabled PC. FIG. 11 provides two entities, the desktop PC running a scaled down trusted version of Linux 1102 and the VeriFIDES Card running a plurality of Microsoft Windows sessions 1101. A scaled down version of Linux would merely provide device drivers and minimal services required to interface with the hardware. A version of trusted Linux (SE, HP, etc.) could be used while stripping out components that are unnecessary for VeriFIDES, including X Windows, multi-user capability, network services, and others. "Userland" could be removed from Linux altogether and VeriFIDES code incorporated into the scaled-down kernel directly.

A user connects to the VeriFIDES PC via user devices 1107. The scaled-down Linux is only accessible from the guest sessions 1101 via the device drivers that are exported to the guest sessions. These drivers will interface over the PCI bus with the corresponding drivers running in the scaled-down Linux. The Linux device drivers need to be validated and trusted, to ensure that they do not provide a "back door" for the Windows sessions.

User input/output is handled by the non-transparent PCI bridge 1103. The non-transparent bridge 1103 handles all user interaction and handles the routing of protected data 1105 and Window sessions data 1106. As discussed previously, protected data 1105 and session data 106 are all intercepted by the VeriFIDES access control 1104 resident on the desktop PC 1102. The VeriFIDES access control 1104 determines the authenticity and validity of each request for data devices 1108 made by a user connecting through the VeriFIDES card 1101, thus preventing invalid access.

In terms of external threats to Linux (via the network interface), the VeriFIDES infrastructure will be intercepting network packets immediately after they come off of the network interface before they are delivered to any guest sessions 104 and 105 or the VeriFIDES operating system 103. This mechanism will determine authenticity of the source, as well as enforce access control, preventing unauthorized hosts from connecting to the machine. The packet interceptor for example may be a small piece of code (under 10K lines of code) that can be hand verified to ensure that it is not susceptible to attacks.

Figure 12:
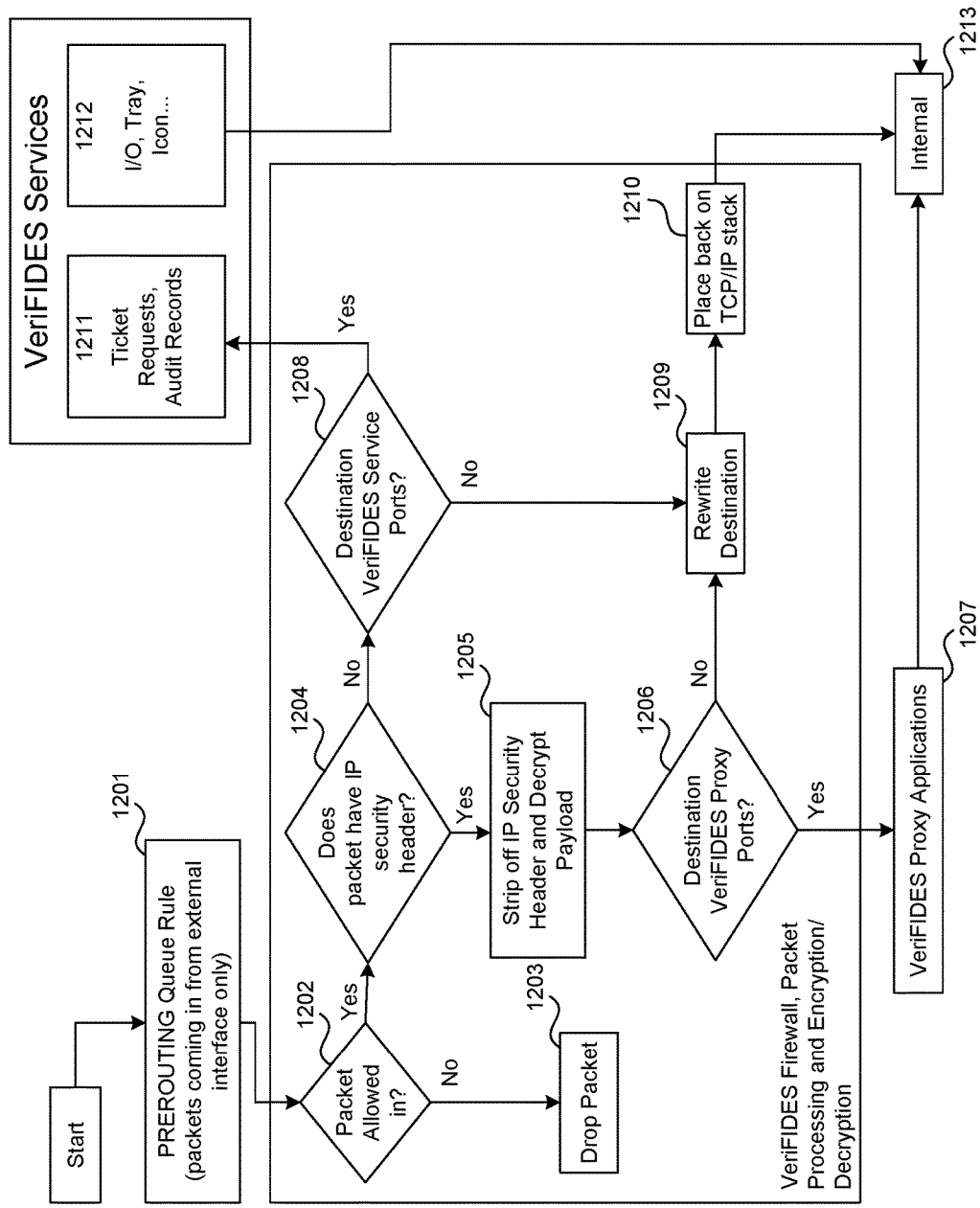
FIG. 12 illustrates a method for monitoring incoming network packets in a preferred embodiment.

FIG. 12 illustrates a method according to an embodiment of the invention for monitoring incoming network packets. As illustrated in FIG. 12, packets are received and queued, step 1201. A determination is first made whether the current packet is allowed within the VeriFIDES system, 1202. If the packet is restricted, it is dropped 1203. If the packet is allowed, it is checked for an IP security header, 1204. If the packet does not contain an IP security header, it is determined whether or not its destination is a VeriFIDES service port, 1208. If the destination is a service port, it is routed to the appropriate service, 1211 such as ticket requests or audit records. If not, the destination is rewritten, 1209 and the packet is placed back on the TCP/IP stack, 1210.

If the packet contains an IP security header, the header is stripped off the packet and the payload is decrypted as previously described, 1205. A final check is performed to determine if the destination is a VeriFIDES proxy port, 1206. If the destination is not a proxy port, the destination is again rewritten, 1209, and the packet is placed back on the TCP/IP stack, 1210. If the destination is, in fact, a proxy port, the packet is routed to the VeriFIDES proxy applications, 1207.

Figure 13:
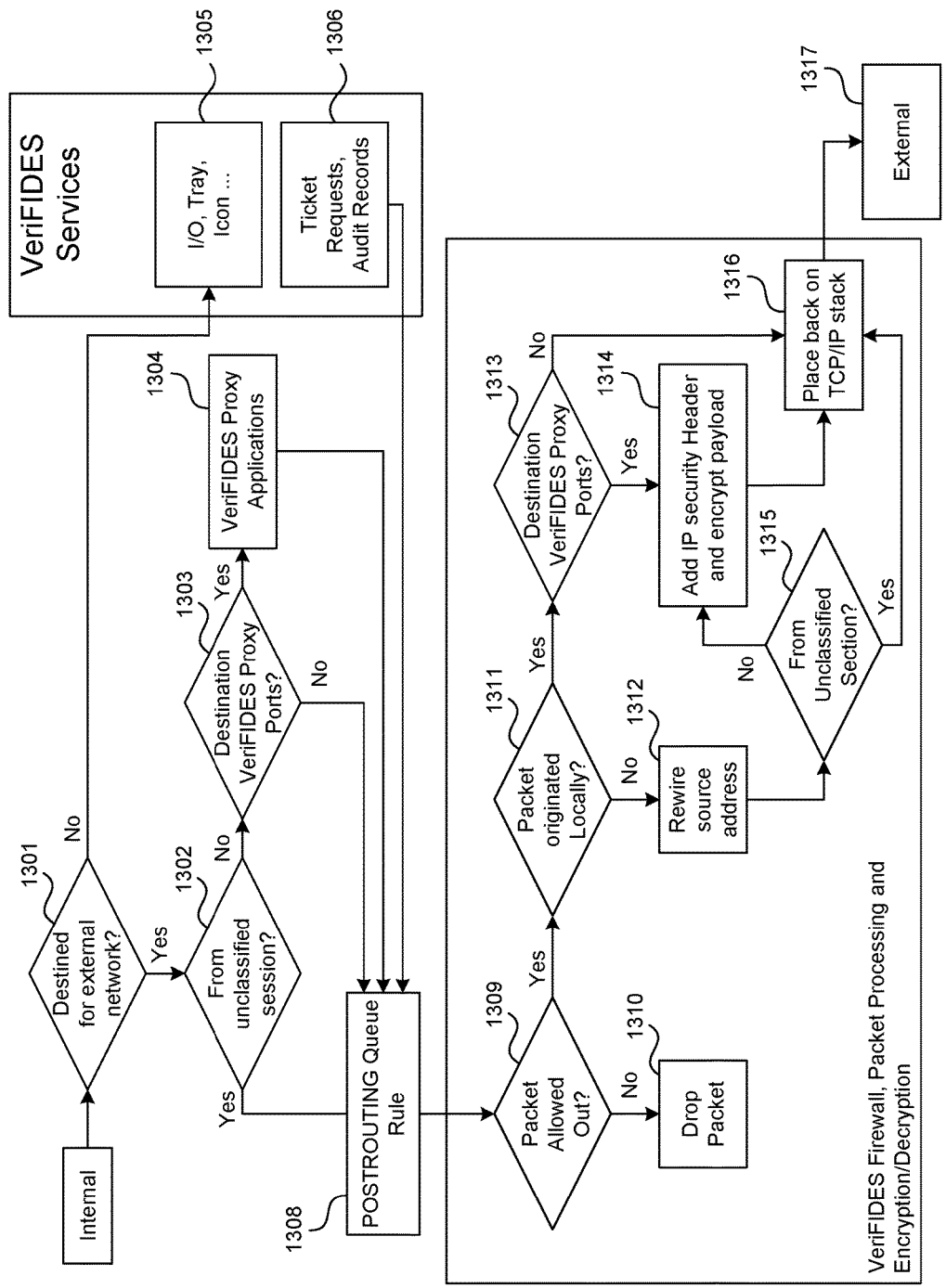
FIG. 13 illustrates a method for monitoring outgoing network packets in a preferred embodiment.

FIG. 13 illustrates a method in accordance with one embodiment for monitoring outgoing network packets. As illustrated in FIG. 13, a packet is first received and determined if it is destined for the external network, 1301. If the packet is not for an external network, it is routed to the appropriate VeriFIDES service, such as I/O, Tray, or Icon services, 1305. If the packet is destined for the external network, it is determined whether it is from an unclassified session, step 1302.

If the packet is not from an unclassified session, a check is made as to whether the packet is destined for a VeriFIDES proxy port, step 1303. If it is, it is forwarded to an appropriate proxy application 1304 and then added to the queue, 1308. If the packet is not destined for a proxy port, it is immediately added to the queue 1308. Furthermore, if the packet is from an unclassified section, it is added straight to the queue, 1308.

A check is then made as to whether the packet is allowed out of the system, 1309. If the packet is not allowed out, it is dropped, 1310. When the packet is allowed out of the system a check is made as to whether the packet originated locally, 1311. If the packet did not originate locally, the source address is rewritten, 1312 and a check is made to determine if the packet came from an unclassified section, 1315.

If the non-local packet is from an unclassified section it is placed on the TCP/IP stack, 1316. If it is from a classified section, IP security header information is added to the packed and the payload is encrypted, 1314. Subsequently the encrypted packet is added to the TCP/IP stack, 1316.

If a packet is determined to have originated locally, 1311, the packet is then checked to determine if its destination is a VeriFIDES proxy port, 1313. If the destination is a proxy port, IP security header information is attached, 1314 and the packet is added to the TCP/IP stack, 1316. If the destination is not a proxy port, the packet is simply added to the TCP/IP stack, 1316.

The only I/O on the single board computer card may be keyboard, video, mouse, and the PCI interface to the main motherboard. That PCI interface consists of a non-transparent PCI bridge that is only programmable from the main motherboard's side. The card, designed to specifications, would be trusted hardware.

As explained earlier, references to RAM generally refer to the RAM on the motherboard (accessible only by Linux and VeriFIDES access control), as well as the RAM on the single board computer card (accessible only by the Windows sessions).

The previously mentioned private key would be stored on the motherboard, for example using something like Trusted Platform Module (TPM) technology.

The VeriFIDES system presented provides numerous advantages over the existing art. First, hackers are prevented from gaining access to data without a ticket or with a forged ticket. The data are encrypted, and the key needed to decrypt them is contained within the ticket. Without a ticket, the user is left with a hard drive full of encrypted gibberish.

Furthermore, tickets are bound to a particular machine via a public/private key pair as specified in the original patent. In some embodiments, VeriFIDES depends on a public key validation mechanism, similar to a trusted certificate authority such as Verisign. A hacker could generate a bogus ticket, but since it couldn't contain the decryption key, it would be useless. What could be spoofed is someone supplying a bogus public key to a ticket server to obtain a ticket allowing a user to decrypt a ticket.

In addition, there is a process for determining whether a particular user had the proper key to decrypt and access the data: All VeriFIDES protected data have a statistically unique random binding associated with the encrypted bytes. This binding is also contained in the ticket, ensuring a match between data and a ticket. The initial specification of a ticket includes the symmetric key to decrypt the data, a binding, and a set of permissions/access rights.

Retaining a ticket is analogous to going to a movie or sporting event. The ticket-taker rips the ticket in half and gives back a stub. When a user adds a VeriFIDES ticket, the access control mechanism keeps a permanent record of that ticket and returns a "stub" to the user. In this fashion, the user is prevented from "re-adding" that ticket since VeriFIDES knows that it was already used. Thus, if a ticket specifies that a user can only see a file 5 times, they cannot use that ticket twice to get 10 viewings.

To perform 'state-based' access control, when a ticket is used, the VeriFIDES access control mechanism retains a portion of the ticket. This section of the ticket will never be seen or accessed again by the user, and corresponds to a ticket collector at a movie theater or sporting event retaining half of a ticket and returning a ticket stub. This allows the access control mechanism to store state information (such as number of accesses, number of copies, number of hard copies, etc.) inside that portion of the ticket. When the user has reached whatever limits may have been specified within the original ticket, the access control mechanism will prevent further access to the data. If the access control mechanism does not retain a portion of the ticket, users could circumvent 'state-based' restrictions by making copies of their tickets. Thus, if a ticket specified that data could be accessed once, a user could make 10 copies of the ticket, allowing them to actually access the data 10 times.

Figure 9:
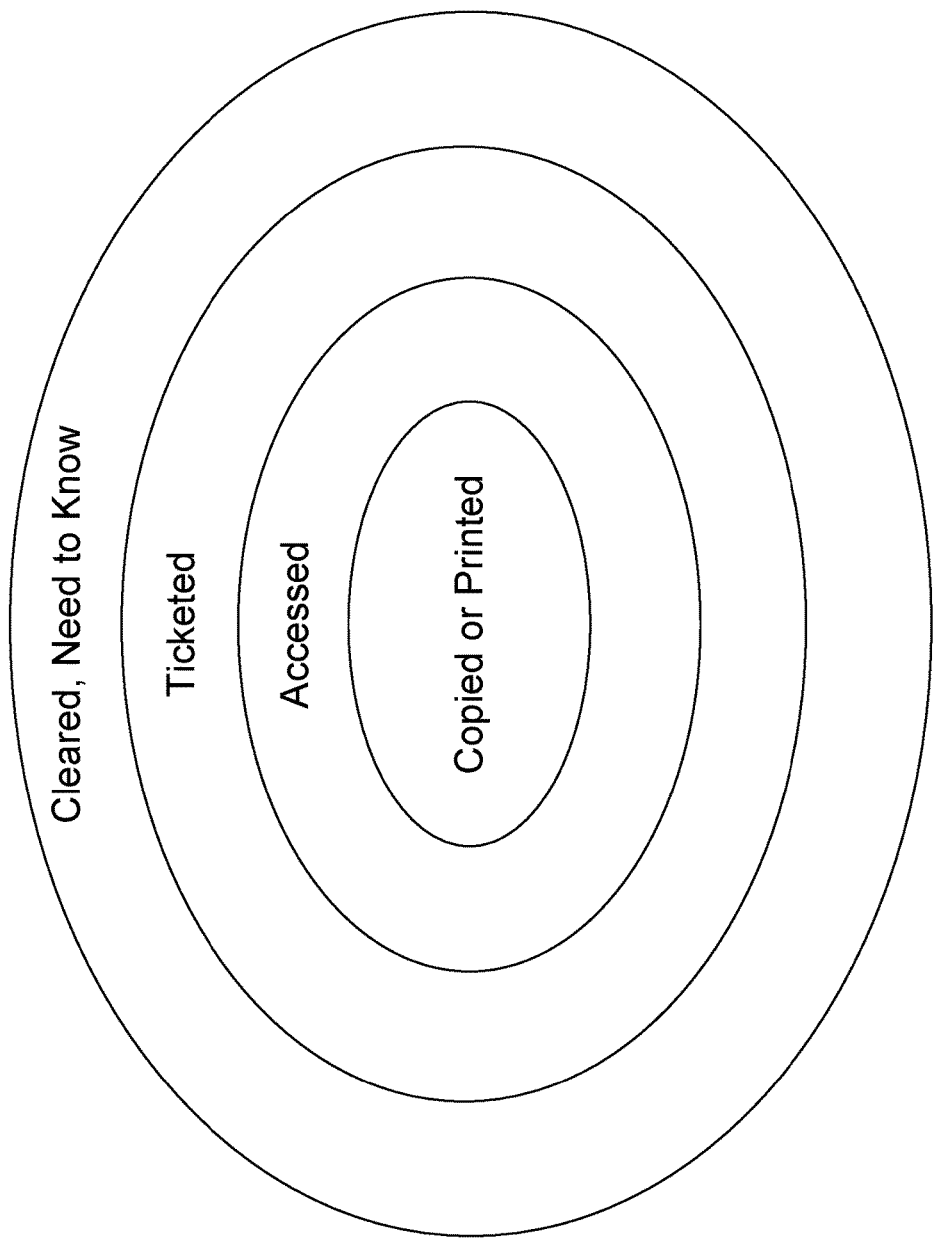
FIG. 9 comprises a diagram illustrating how VeriFIDES can be used to limit the sphere of compromise of data.

FIG. 9 comprises a diagram illustrating how VeriFIDES can be used to limit the sphere of compromise of data. In the event of compromise, it can be known exactly what files a particular user had tickets (decryption keys) for, when those files were accessed, and what type of access (view, copy, print, etc.) occurred.

For limiting the sphere of compromise, with VeriFIDES, the audit and logging functions occurring below the operating system give a much higher degree of assurance and a higher fidelity of data. Additionally, as all data are encrypted and accessed with tickets, it can be known whether a particular user even had the key to decrypt and access protected data, giving greater confidence that data have not been compromised.

For 'state-based' access control, with VeriFIDES, we can provide a higher degree of assurance that 'state-based' permissions are being enforced since the state information is being stored in a location completely inaccessible to the user. Ticket Stubs allow the system to enforce "state-based" access control, such as controlling the number of times data are accessed, printed, copied, etc. This can have a huge benefit for entertainment content by enforcing the number of times a movie/game can be played. Limiting the sphere of compromise can also provide enormous financial benefits both to the government and the commercial worlds. In the event that data are compromised, VeriFIDES can drastically reduce the scope of data to be examined/concerned about.

Figure 3:
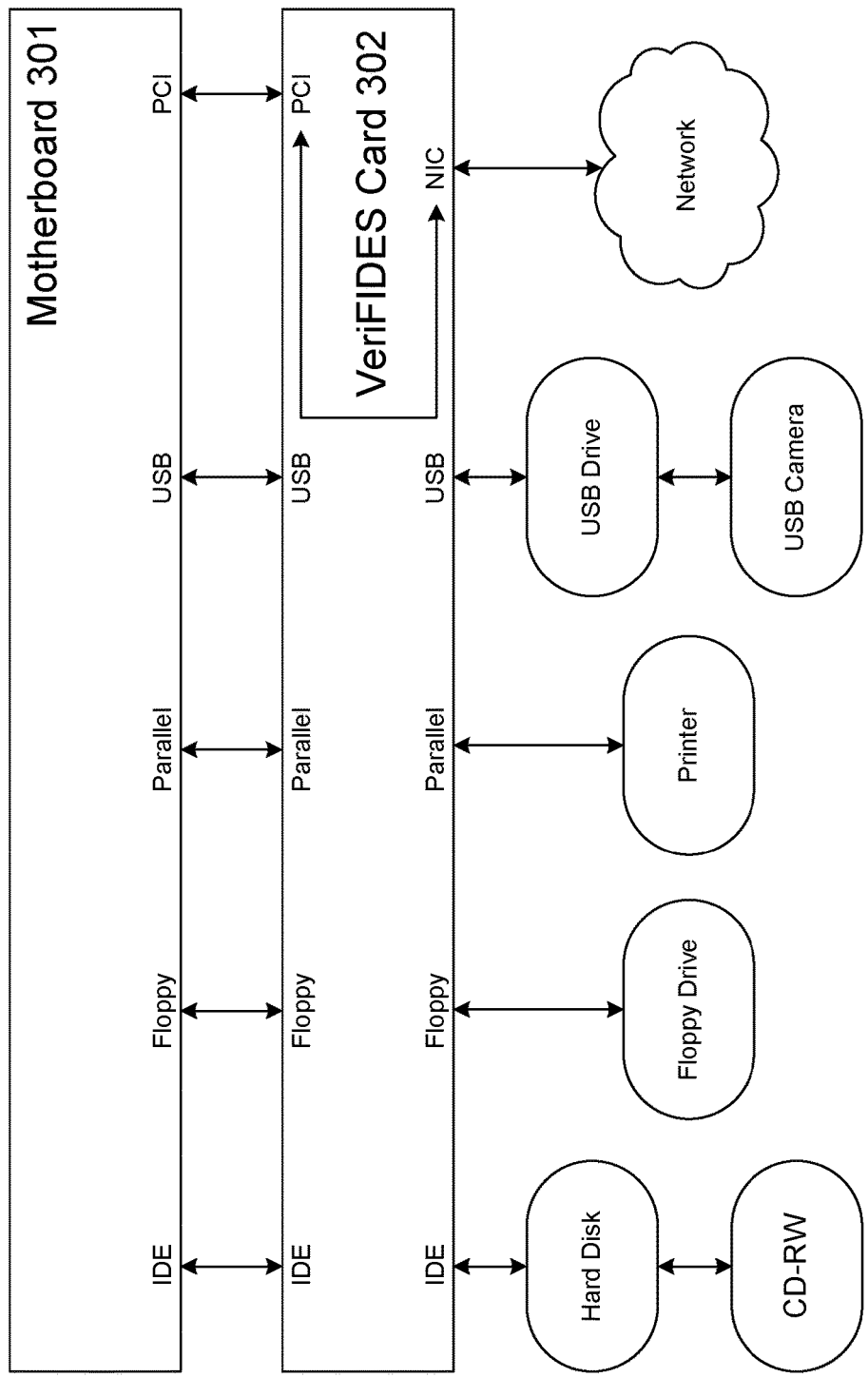
FIG. 3 presents an alternative embodiment of the VeriFIDES system comprising a motherboard and communicatively coupled processing board.

FIG. 3 illustrates an alternative embodiment of the VeriFIDES system comprising a motherboard 301 and a communicatively coupled processing board 302. As illustrated in FIG. 3, the VeriFIDES system is implemented as a co-processor on a board. A board 302 containing a processor could be inserted into the computer. This board would contain dual I/O channels for every type of I/O controller present on the mother board (or peripheral cards) 301. All I/O would be re-routed from the motherboard/peripheral cards to inputs of the card containing the co-processor. The output ports of the card would be connected to the actual I/O devices. In this manner, all I/O would be routed through the access control software running on the processor on the board, thus implementing VeriFIDES functionality.

Figure 4:
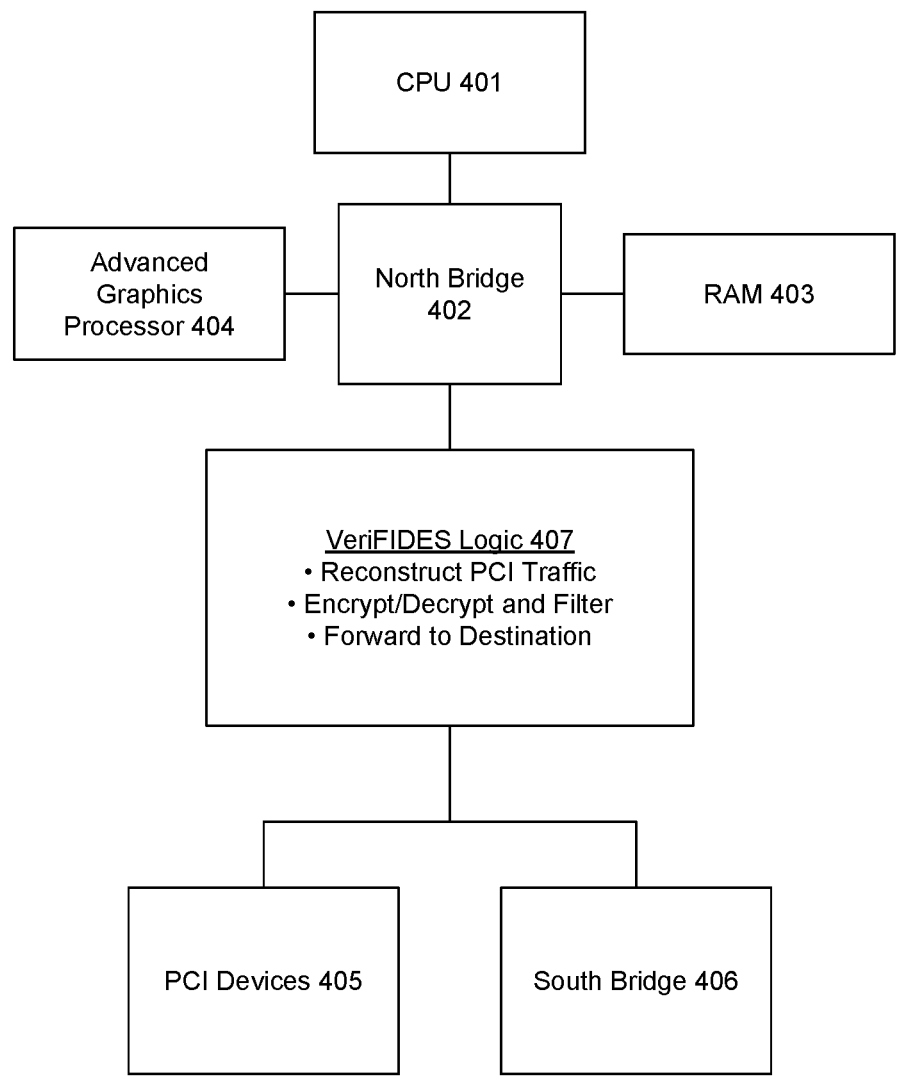
FIG. 4 presents an alternative embodiment of the VeriFIDES system comprising VeriFIDES logic implemented as a PCI bridge.

FIG. 4 illustrates an alternative embodiment of the VeriFIDES system comprising VeriFIDES logic implemented as a PCI bridge. As illustrated in FIG. 4, the VeriFIDES system is implemented as a PCI bridge 403. Elements 401-406 comprise a CPU, north bridge, random access memory, advanced graphics processor, PCI devices and south bridge, respectively. These elements are well known in the art and comprise a standard architecture for a computing device.

As illustrated, the VeriFIDES system is implemented within a PCI bridge 407 resident immediately after the north bridge 402. By incorporating additional processing capability into a PCI bridge, the access control mechanism can be executed within the bridge. The access control software would be responsible for interpreting the PCI bus traffic, determining what to do with I/O data (encrypt, decrypt, block, etc.), and then re-forwarding the I/O data to the CPU and/or main memory.

Figure 5:
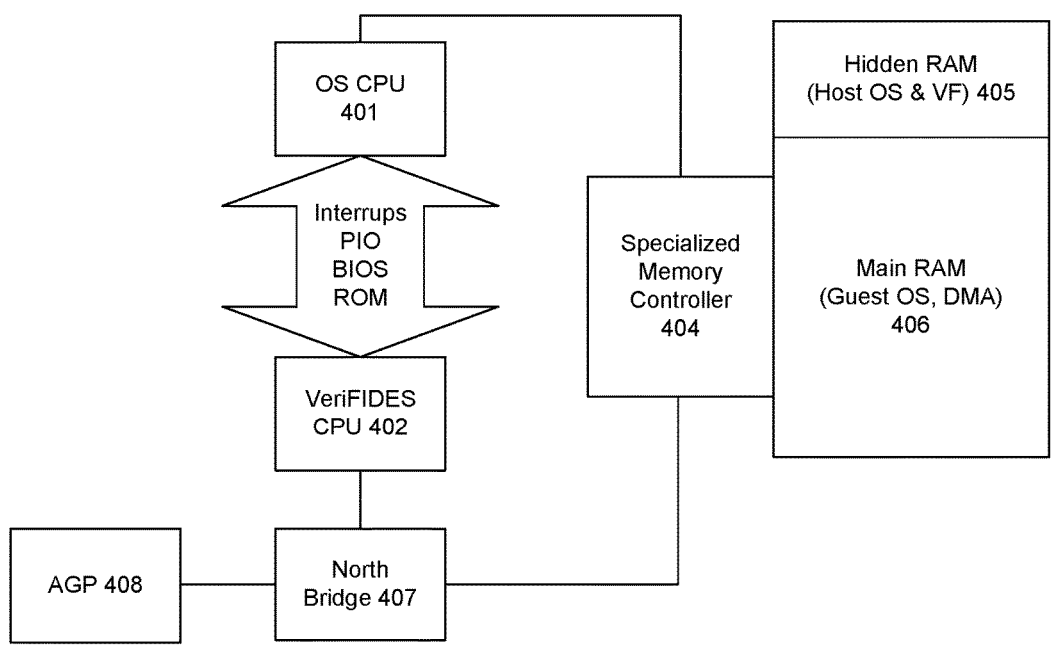
FIG. 5 presents an alternative embodiment of the VeriFIDES system comprising the VeriFIDES system implemented as a co-processor.

FIG. 5 illustrates an alternative embodiment of the VeriFIDES system comprising the VeriFIDES system implemented as a co-processor. As illustrated in FIG. 5, the VeriFIDES system is implemented as a co-processor 402. In this dual processor architecture, the operating system executes on one processor 401 and the access control software executes on the second 402. The architecture defines a special bus 403 between the two processors for transferring interrupts, programmed I/O, and BIOS information from the access control CPU 402 to the operating system CPU 401. The access control CPU communicates with the rest of the computer hardware 404-408 in a traditional manner known to those in the art.

The architecture includes a dual port memory 405-406 with special address translation hardware 404 preventing the OS CPU 401 from accessing portions of memory containing the access control program, crypto keys, and other data that needs hiding 405.

It is known to use a co-Processor and hypervisor software. Also, Sun Microsystems has a product, the Sun PCI card, that is a full PC on a card that interacts with the Solaris Operating system via special Windows device drivers. The full PC functionality on the card would not be needed in the present embodiment nor new device drivers for Windows. The methods of the prior art require backing and support of computer manufacturers. In addition, Type I virtual machine software requires significant expertise and is difficult to write. A virtual machine does not provide many of the programming 'services' that a traditional OS does, making the implementation of VeriFIDES business logic much more difficult.

Figure 6:
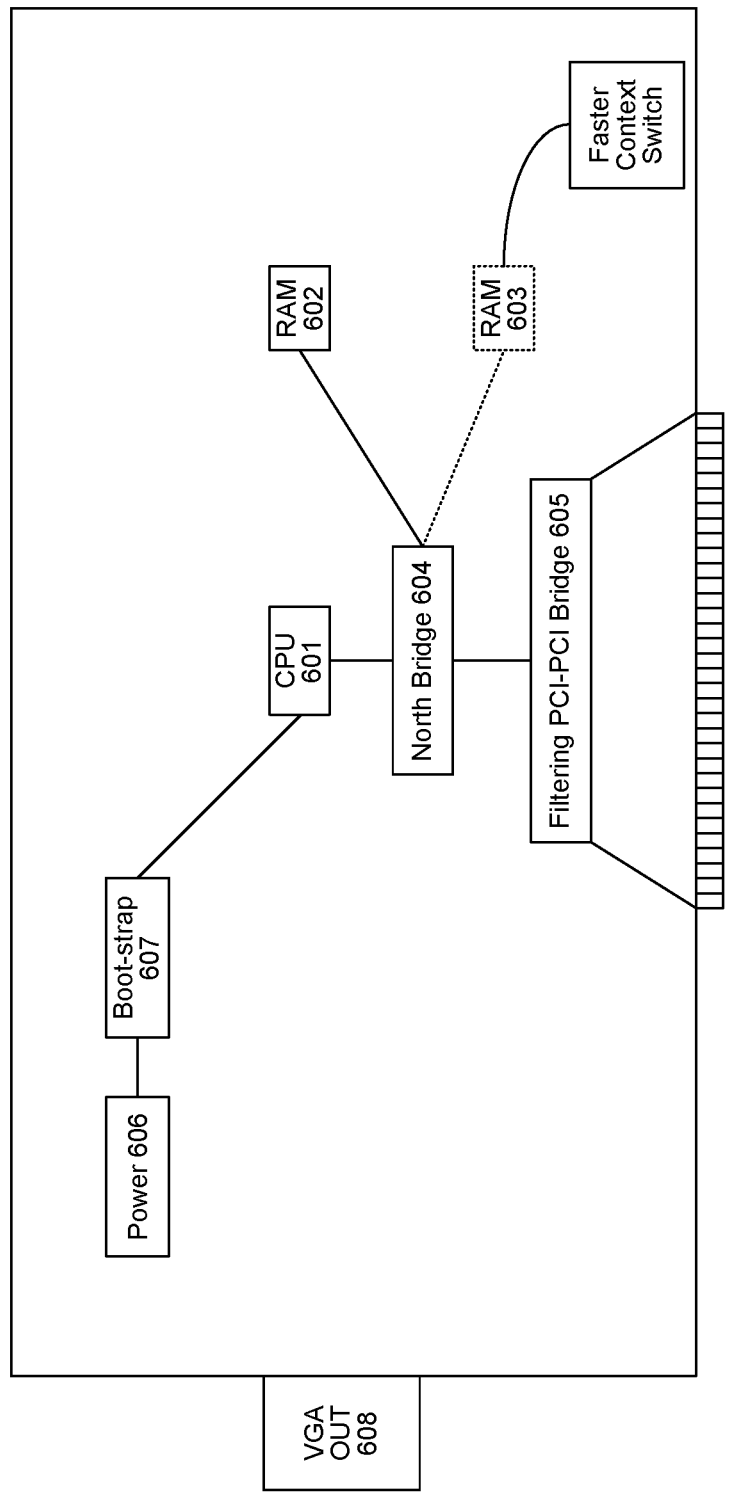
FIG. 6 presents an exemplary system of the present invention comprising the VeriFIDES system residing on a separate peripheral card.

FIG. 6 illustrates an exemplary system of the present invention comprising the VeriFIDES system residing on a separate peripheral card. A card is installed containing its own memory 602, processor 601, and video out 608. This card will be responsible for running the 'guest' operating system (typically MS Windows). The main computer will run a modified version of Linux that will export 'virtual' representations of all I/O devices attached to the computer. Linux will be responsible for intercepting all I/O and performing VeriFIDES business logic (encrypt, decrypt, block, watermark, etc.). The VeriFIDES card will also need to contain a special filter, that will prevent the CPU on the card from discovering the real I/O devices attached to the bus, and only allow data from our 'virtual' devices exported by Linux.

Figure 7:
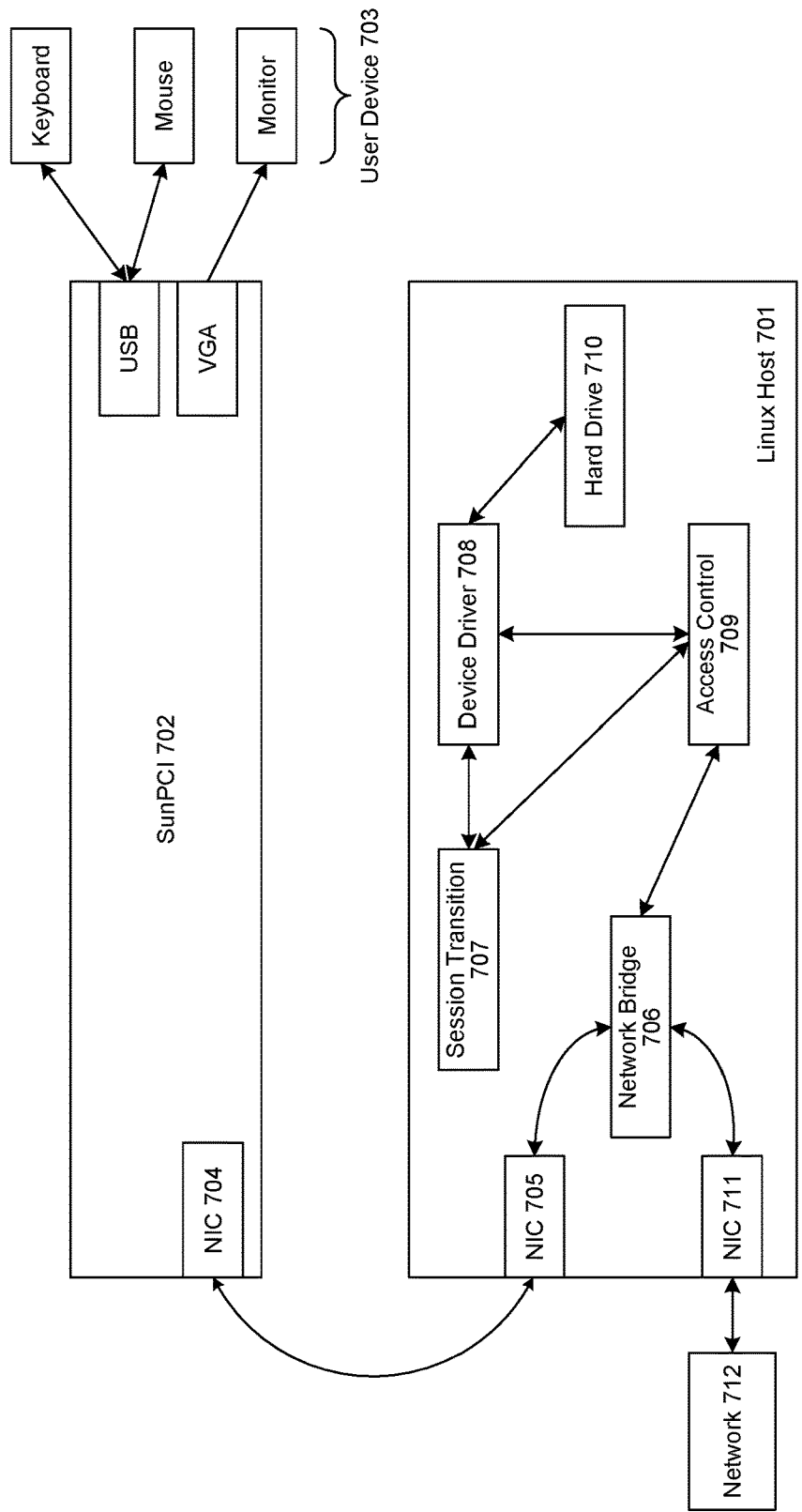
FIG. 7 presents a further embodiment of a guest operating system running on a card connected to a main computer.

FIG. 7 illustrates a further embodiment of a guest operating system running on a card connected to a main computer. As illustrated, SunPCI card 702 is connected to a main board running Linux 701 via a network connection between NIC 704 and NIC 705. The SunPCI card 702 allows for user interaction via USB and VGA ports connected to user devices 703.

All user interaction is processed from NIC 704 to NIC 705 and is received by network bridge 706. Network bridge 706 forwards all requests to access control 709 which verifies the authenticity of the requests and forwards data to the session transition module 707 or the device driver 708. The host hard drive 710 is operable to receive request from the device driver 708 and return requested data to the SunPCI card 702 in accordance with the access control 709 policies. Access control 709 is further operable to receive external network requests from a network 712 through NIC 711 and network bridge 706. As described, network requests may be monitored and verified by access control 709 prior to their acceptance by the VeriFIDES system.

The previously presented embodiments allow PC's to be upgraded with VeriFIDES functionality, rather than having to incorporate VeriFIDES into newly manufactured PC's. Additionally, because VeriFIDES business logic would be running within an operating system such as Linux rather than a virtual machine, a large volume of software libraries and services are available for use that greatly simplify VeriFIDES development. This method provides a way to upgrade existing computers with VeriFIDES functionality by inserting a board and re-installing Windows. This method does not require the backing of computer/BIOS manufacturers to deploy VeriFIDES.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

Appendix A

```xml
<?xml version="1.0"?>
<ticket>
        <!-- options are user, file, host, connection -->
        <type/>
        <!-- see identifier section below -->
        <identifier> IDENTIFIER_XML </identifier>
        <!-- targetMachine is the machine this ticket is intended for. -->
        <targetMachine> string </targetMachine>
        <!-- The binding has different meanings depending on the ticket type.
                Last byte of all bindings indicates what type of ticket the binding is
associated with: 0 = user, 1 = file, 2 = host, 4 = connection
                Binding is always 32 bytes
                User tickets: 31 bytes Random + 1 byte type
                File tickets: 31 bytes Random + 1 byte type
                Host tickets: 4 byte ip + 27 byte 0's + 1 byte type
                Connection tickets: 4 byte dst ip + 4 byte src ip + 2 byte dst port +
                                    2 byte connection type + 19 bytes random + 1 byte type
        -->
        <binding> base64(bytes) </binding>
        <!-- see below. this is xml describing the security restrictions
                on a VeriFIDES machine using the ticket
                probably empty for a Host Ticket
        -->
        <permissions> PERMISSIONS_XML </permissions>
        <!-- this is the version of the ticket format. -->
        <version/>
        <!-- globally unique ticket id. any ticket creator will generate a unique
                one of these for every ticket it produces -->
        <gutid> base64(bytes) </gutid>
        <!-- the machine where audit messages go -->
        <auditServer/>
        <!-- the machine that "owns" the data. originator. where you can go to
                get this ticket (may be a proxy for the owner) -->
        <ticketServer/>
        <!-- the machine that generated this ticket -->
        <ticketCreator/>
        <!-- in the preview section keys only contains the ticketMessageKey
                it contains the real keys in the authoritative section -->
        <keys>
                <!-- this is the symmetric key needed to decrypt the authoritative
section encrypted with the public key of the verifides machine it is intended for.
                -->
                <ticketMessageKey> base64(RSA(ticketKey:ticketIV)) </ticketMessageKey>
        </keys>
        <authoritative> base64(AES(
                <!-- authoritativeTicket is here just so that when we decrypt we have
valid xml with a top level tag. Not needed in some embodiments -->
                <authoritativeTicket>
                        <type/>
                        <identifier/>  <!-- see structure above -->
                        <targetMachine/>
                        <binding> base64(bytes) </binding>
                        <permissions> PERMISSIONS_XML </permissions>
                        <version/>
                        <gutid> base64(bytes) </gutid>
                        <auditServer/>
                        <ticketServer/>
                        <ticketCreator/>
                        <-- these keys differ depending on the ticket type. see "keys"
below -->
                        <keys> KEYS_XML </keys>
                </authoritativeTicket>
        ))
        </authoritative>
</ticket>
<!--
  IDENTIFIER SECTION
  identifiers contain the things access control needs to look up the ticket.
  they don't change the state of the system.
-->
```

```
<identifier>
        <!-- For User, File, and Connection Tickets.
            For User Tickets this tells us which
            user is being defined by this ticket.  For File and Connection
            tickets this tells us which user may access this ticket.
            These may contain wildcards in File and Connection tickets
            to indicate that any user on the machine may use the ticket.
            These fields are empty in Host tickets.
        -->
        <domain/>
        <username/>
        <!-- For User, File, and Connection Tickets.
            May contain a wildcard if this ticket may be used
            in any session on the machine.
            This field is empty in Host tickets.
        -->
        <classification/> <!-- "Secret", "Top Secret", etc... -->
        <!-- For File Tickets -->
        <filename/> <!-- useful but not authoritative because names change -->
        <!-- For Host Tickets and Connection Tickets.
            This field contains the hostname of the machin> we may wish
            to communicate with.  This ticket contains this machine's public
            key.
        -->
        <remoteHostname/>
        <!-- For Connection Tickets.
            These fields describe the communication paths that this ticket
            enables.  Port, type, and resource may contain wildcards.
        -->
        <port/>
        <type/> <!-- Client, Server, Both -->
        <!-- for things such as web service
            url, jabber user, etc -->
        <resource/>
</identifier>
<!--
 KEYS
 all keys are now going to go in the "keys" section inside authoritative.
 we need a way to sign the ticket to ensure that the ticketCreator is who they
 say they are, otherwise we could spoof a ticket server and get network
 connections from malicious machines.  different types of tickets will implement
 different elements inside the keys section.
-->
<keys>
        <!-- required in ticket of type "file" -->
        <!-- used to decrypt files including local files, remote files,
            emails, web pages. -->
        <fileKey> base64(bytes) </fileKey>
        <!-- required in ticket of type "host" -->
        <!-- contains the certificate of another machine so that you can
            authenticates remote machine.  VerifIDES boxes may
            be prestaged with the host ticket for their ticket server and
            audit server.  the TS can also serve as your PKI by giving you
            other host tickets.
        -->
        <hostKey> base64(bytes) </hostKey>
        <!-- in ticket of type "connection."  not required.-->
        <!--in some embodiments this is not needed but it provides orthogonality.
            In some embodiments the symmetric key for communication with another host
 could be put here instead of doing a negotiation once both sides have a host key.
        -->
        <connectionKey> base64(bytes) <connectionKey>
        <!-- required in ticket of type "user."  may be present in other types. -->
        <!-- These are keys or other info for authentication via various schemes.
            could include smartcard, fingerprint, passphrase etc.
            In user tickets these describe how a user gets in.
            In other types, they could set specific passwords, smartcards to
            access this data rather than just authenticating the user.
        -->
        <userKey type="TYPE1"> base64(bytes) </userKey>
        <userKey type="TYPE2"> base64(bytes) </userKey>
```

```xml
        <userKey type="TYPE3"> base64(bytes) </userKey>
        <!-- we need a way to ensure that this ticket came from who it said
             it came from otherwise it would be easy to get unauthorized
             network access.
        -->
        <ticketCreatorSignature> base64(hash of something in ticket)
</ticketCreatorSignature>
<keys>
<!--
   Permissions XML is xml inside a ticket which is used for the representation
   of permissions for the VeriFIDES file the ticket was issued for. It tells
   the system how to behave and which system resources to restrict access to.
   This is what permissions look like. They will be in all tickets except for
   "host" tickets. As per prior convention, anything can be left empty.
   If it is empty, permissions default to permissions defined up the chain
   of ticket types. If not defined anywhere, they default to system defaults
   which have been described in the permissions document.
   While the permissions section is a section inside the ticket XML, we can
   (and the permissions subsystem does) treat it as a standalone XML doc.
   Here is the basic structure of a permissions XML document:
-->
<permissions>
        <!--
           method will have an arbitrary type.
           AC matches type with the type in the userKey. I sends type to a
           function registered for that type. It sends the key gathered from the userKey
           section.
           The method returns true or false if access is allowed or not.
        -->
        <userAuthentication>
                <!-- required tells you if this method is required on data ticket open
(yes),
                     or not (no), or if it is only required once per session (session).
                     if required is an integer, we are doing some kind of
reauthentication every [int] minutes. Action is something like "golow" or "logout" or
"destroy my machine." It is only used when int runs out. -->
                <method type="fingerprint"
                        required="yes|no|session|[int]"
                        action="-something-"/>
                <method type="smartcard">
                        required="yes|no|session|[int]"
                        action="-something-"/>
                <method type="passphrase">
                        required="yes|no|session|[int]"
                        action="-something-"/>
                <method type="[arbitrary]">
                        required="yes|no|session|[int]"
                        action="-something-"/>
        </userAuthentication>
        <!-- -filesystem
           the access attribute can be set to "disabled", "ro", or "rw". If disabled,
           this device will be disabled for the rest of the session (meaning that no
           reads or writes are allowed). If "ro", this device will only allow reads
           for the rest of the session if it previously allowed writes. If "rw", access
           to this device is not restricted. Default: rw.
           the "unclass" share is a special share which allows the user transfer
           unencrypted files from an Unclassified session to the Classified session.
           In some embodiments, put files in here while Classified because they
           will be encrypted and no tickets will be generated for them.
           the "verifides" share is the location of encrypted verifides files on the
           system which will be automatically decrypted in a protected session provided
           the correct ticket is present.
           from a pure security perspective, treating external media I/O devices
           differently from each other makes no sense.
           further, disabled make no sense at all unless you disable everything
           from a usability perspective these are nice. there may be some benefit
           to shutting off different kinds of busses. especially removable busses.
           discussion for another day.
        -->
        <filesystem>
                <cdrom access="{disabled|ro|rw}"/>
```

```
        <cdrw access="(disabled|ro|rw)"/>
        <usb access="(disabled|ro|rw)"/>
        <verifides access="(disabled|ro|rw)"/>
        <unclass access="(disabled|ro|rw)"/>
</filesystem>
<!-- time is one of the most complex structures in a ticket.
    see the time section below for details -->
<time>
        <NOT>|<INTERSECTION>|<UNION>
                <timerange start="(INT)" stop="(INT)"/>
                <timecycle scale="(min|hour|mday|wday|mon|yday)"
                    first="(INT)"
                    last="(INT)"
                />
        </NOT>|</INTERSECTION>|</UNION>
</time>
<!-- This is a list of connections allowed while
    this ticket is in use we could just shut them when ticket is
    opened. we could also not allow the ticket to be opened.
    Figure how to express each.
    It follows the
    hosts.allow/hosts.deny system with modifications. To talk
    to an ip, that ip must pass this test as expressed in every
    open ticket. may contain wildcards. see manpages for
    hosts.allow, hosts.options, tcp wrappers
-->
<connectionsAllowed>
        <connection> ip:[port-port]:[resource]:[ALLOW|DENY] </connection>
        ...
</connectionsAllowed>
<!-- List of bindings that can be in use at the same time
    as this ticket.
    go through the list. if allowed, true, if denied false,
    if unlisted true. wildcards (including ALL) used.
-->
<bindingsAllowed>
        <binding type="deny|allow"> base64(bytes) </binding>
        ...
</bindingsAllowed>
<!-- only allow concurrent access to tickets with the following originators
    or ticket servers.
-->
<ticketSourceAllowed>
        <ticketServer type="deny|allow"> ip:[ALLOW|DENY] </ticketServer>
        ...
</ticketSourceAllowed>
<!-- countdown -
    this is a value in minutes that indicates how long a document can be
    accessed before the system reverts to an Unclassified mode and destroys the
    session. Default: infinite.
-->
<countdown minutes="(INT)"/>
<!-- accesscount -
    this value indicates the number of Classified sessions in which
    this document can be accessed. Note that this document doesn't decrement
    every time you open a file, but rather every time you open a file in a
    different session. For example, if your access count is 2, then open the
    file in Classified, your access count will drop to 1. Opening it again in
    that session will not affect the access count. If you then say "Finished",
    then go back to the Classified session, and open the file again, your access
    count will drop to 0. Default: infinite.
-->
<accesscount count="(INT)"/>
<!-- printing -
    the printcount attribute tells how many times you may print a document on
    the system. Warning: printcount will be decremented for every file that has
    been opened in a Classified session every time you print one document.
    Default: infinite.
            the watermark attribute tells the printing subsystem to print a watermark
    containing the specified string on top of each printed page. Default:
```

```
            no watermark.
            the allowed attribute is "true" or "false."  If true, printing is enabled.
            If false printing is disabled.  Default: true.
        -->
        <printing printcount="(INT)" watermark="(STRING)" allowed="(true|false)"/>
        <!-- phonehome
            By forcing the system to remain in contact with the ticket server, it allows
            the ticket server to revoke the ticket (or destroy private keys if the
            conops permit).  this prevents a user from unplugging from the network to
            avoid server initiated ticket revocation or destruction of private keys.
            the minutes attribute indicates the number of minutes between system
            initiated contacts with the ticket server for this particular ticket.
            Default: Infinite, no contact required.
            the timeout attribute indicates how long the system will give the user to
            re-establish communication with the ticket server after a system initiated
            contact failed.  Default: zero, action taken immediately.
            the action attribute determines what action will be taken if communication
            is not established with the ticket server within the allowed timeout period.
            "golow" will force the Classified session to exit and be destroyed.  "revoke"
            will destroy the session and revoke this ticket.  "bigred" will destroy the
            private keys on the system.
        -->
        <phonehome minutes="(INT)" timeout="(INT)" action="(golow|revoke|bigred)"/>
</permissions>
<!--
time -
            This is a subsystem all of its own.  The purpose of this system is to
provide a powerful and generic facility for specifying times at which this ticket   can
or can not be used to decrypt a file.
            all tags for this subsystem are contained inside the <time></time> tags.

Primitives
            There are 2 time permission primitives inside this section:
            These primitives are compared against a supplied time and reduce
            to a truth value (either "true" or "false")
            1.  <timerange start="(INT)" stop="(INT)"/>
            2.  <timecycle scale="(min|hour|mday|wday|mon|yday)"
                    first="(INT)"
                    last="(INT)"
                />
            The timerange tag describes a range of time between two integers whose
values are seconds since the UNIX epoch (Jan 1 1970).  Any time in this range (inclusive)
will be considered "true" and anything outside will be considered "false".
            The timecycle tag describes a cycle of time on the scale specified.
            Example: <timecycle scale="hour" first="9" last="17"/>  will be "true"
between 9am and 5pm.
            Example: <timecycle scale="mon" first="1" last="4"/>  will be "true"
during
            January through April of any year.

Operators
            There are 3 time permissions operators inside this section:
            When the operators are evaluated they reduce to permission primitives.
            ("true" or "false")
            1.  <NOT>(1 primitive)</NOT>
            2.  <INTERSECTION>(N primitive(s)) <INTERSECTION/>
            3.  <UNION>(N primitive(s)) <UNION/>
            The NOT operator inverts the output of the primitive inside it.
            Example:
            <NOT>
                <timecycle scale="mon" first="1" last="4"/>
            </NOT>
            will evaluate to "true" during a time that is in May through December of
any year.
            The INTERSECTION operator operates on N primitives and evaluates to
"true" if ALL primitives inside it evaluate to "true".
            Example:
            <INTERSECTION>
                <timecycle scale="hour" first="9" last="17"/>
                <timecycle scale="mon" first="1" last="4"/>
            </INTERSECTION>
``` will evaluate to "true" during business hours in January through April of any year.

The UNION operator operates on N primitives and evaluates to "true" if ANY OF THE primitives inside it evaluate to "true".

Example:
```xml
<UNION>
    <timecycle scale="hour" first="9" last="11"/>
    <timecycle scale="hour" first="1" last="17"/>
<UNION>
```
This example evaluates to true during business hours but excludes a lunch hour between 12 and 1. Note that "11" on the scale of hours evaluates to true at "11:00" through "11:59" The "last" value is always inclusive.

Recursion

The operators can recursively contain other operators so long as they contain the correct number of primitives after all the operators and primitives inside them reduce to the correct number of truth values. There is no limit placed on the level of descent.

Example:
```xml
<time>
    <INTERSECTION>
        <timerange start="1072196405" stop="1072210999"/>
        <NOT>
            <UNION>
                <timecycle scale="mday" first="10" last="18"/>
                <INTERSECTION>
                    <timecycle scale="hour" first="10" last="20"/>
                    <timecycle scale="yday" first="12" last="40"/>
                </INTERSECTION>
            </UNION>
        </NOT>
    </INTERSECTION>
</time>
```

Here is an example demonstrating how to do business hours between 8:30am and 6:00pm:
```xml
<time>
    <UNION>
        <timecycle scale="hour" first="9" last="18"/>
        <INTERSECTION>
            <timecycle scale="hour" first="8" last="8"/>
            <timecycle scale="mins" first="30" last="60"/>
        </INTERSECTION>
    </UNION>
</time>
```

Computationally the processing of the time section in permissions is done using a Reverse Polish Notation (RPN) recursive descent scheme.
-->

We claim:

1. A method for protecting data on a computing system, the method comprising:
executing, under a trusted operating system, an access control component that controls access to protected data;
identifying, by the access control component, an input or output hardware component of the computing system, the input or output hardware component accessible by a guest operating system different from the trusted operating system;
disabling, by the access control component, the identified input or output hardware component by blocking one or more communications with the identified input or output hardware component to preclude access to the identified input or output hardware component by the guest operating system; and
accessing, by at least one application running under the guest operating system, the protected data, wherein the at least one application is permitted to access the protected data through use of a decryption key received from the access control component by the guest operating system.

2. The method of claim 1, wherein the decryption key is sent from the access control component to the guest operating system in response to disabling the identified input or output hardware component.

3. The method of claim 1, wherein the protected data is protected by being encrypted, and wherein the trusted operating system is configured to use the decryption key to decrypt the protected data in accordance with one or more rules specified hi a ticket provided by the access control component.

4. The method of claim 3, wherein the ticket is a user authentication ticket identifying a user the ticket applies to and defining permissions indicating usage restrictions for the user to access the protected data.

5. The method of claim 3, wherein the ticket is a host authentication ticket specifying a plurality of public keys, each public key associated with one of a plurality of computing apparatuses having a hardware-embedded private key, the host authentication ticket configured to facilitate communication between the computing system and one or more of the plurality of computing apparatuses.

6. The method of claim 3, wherein the ticket is a connection data ticket identifying a connection for communications between the computing system and another computing apparatus and specifying a key for encrypting network traffic using the connection.

7. The method of claim 1, wherein the trusted operating system is configured to store the decryption key only on a main motherboard of the computing system.

8. The method of claim 1, further comprising:
detecting an attempt to tamper with the computing system; and
in response to the detecting the attempt to tamper with the computing system, deleting the decryption key.

9. The method of claim 1, wherein disabling the identified input or output hardware component comprises one or more of:
disabling use of a printing device;
disabling use of a media drive;
disabling use of one or more USB interfaces; or
any combination thereof.

10. The method of claim 1 wherein the guest operating system different from the trusted operating system operates on one or more computer cards coupled to a motherboard of the computing system via a communications bus, the one or more computer cards including one or more second processors and a second memory.

11. The method of claim 1 further comprising:
re-routing input and output between a motherboard and peripheral cards to go through a board connected to the motherboard,
wherein disabling the identified input or output hardware component is performed on the board connected to the motherboard.

12. The method of claim 1 wherein disabling the identified input or output hardware component is performed by blocking, with a processing capability incorporated into a PCI bridge, input and/or output requests.

13. The method of claim 1,
wherein the guest operating system is executed by a peripheral card connected to a motherboard of the computing system; and
wherein the peripheral card has access to the input or output hardware component through one or more virtual representations of devices attached to the computing system.

14. A computer-readable storage medium that is not a signal per se which stores instructions that, when executed by a computing system, cause the computing system to perform operations for protecting data, the operations comprising:
executing, under a trusted operating system, an access control component that controls access to protected data;
identifying, by the access control component, an input or output hardware component of the computing system, the input or output hardware component accessible by a guest operating system different from the trusted operating system;
disabling, by the access control component, the identified input or output hardware component by blocking one or more communications with the identified input or output hardware component to preclude access to the identified input or output hardware component by the guest operating system; and
accessing, by at least one software application running under the guest operating system, the protected data, wherein the at least one software application is permitted to access the protected data through use of a decryption key received from the access control component by the guest operating system.

15. The computer-readable storage medium of claim 14, herein the operations further comprise:
detecting an attempt to tamper with the computing system; and
in response to the detecting, deleting the decryption key.

16. The computer-readable storage medium of claim 14, wherein disabling the identified input or output hardware component comprises one or more of:
disabling use of a printing device;
disabling use of a media drive;
disabling use of one or more USB interfaces; or
any combination thereof.

17. The computer-readable storage medium of claim 14, wherein the operations further comprise re-routing input and output between a motherboard and peripheral cards to go through a board connected to the motherboard; and
wherein disabling the identified input or output hardware component is performed on the board connected to the motherboard.

18. The computer-readable storage medium of claim 14,
wherein the guest operating system is executed by a peripheral card connected to a motherboard of the computing system; and
wherein the peripheral card has access to the input or output hardware component through one or more virtual representations of devices attached to the computing system.

19. A computing system comprising:
one or more processors;
a memory;
one or more input or output hardware components; and
an access control component executed under a trusted operating system configured to control access to protected data by:
  identifying an input or output hardware component, of the one or more input or output hardware components, wherein the identified input or output hardware component is accessible by a guest operating system different from the trusted operating system;
  disabling the identified input or output hardware component by blocking one or more communications with the identified input or output hardware component to preclude access to the identified input or output hardware component by the guest operating system; and
  accessing, by at least one software application running under the guest operating system, the protected data, wherein the at least one software application is permitted to access the protected data through use of a decryption key received from the access control component by the guest operating system.

20. The computing system of claim 19, wherein the access control component is further configured to:
  detect an attempt to tamper with the computing system; and
  in response to detecting the attempt to tamper with the computing system, delete the decryption key.

21. The computing system of claim 19, wherein disabling the identified input or output hardware component comprises one or more of:
  disabling use of a printing device;
  disabling use of a media drive;
  disabling use of one or more USB interfaces; or
  any combination thereof.

22. The computer-readable storage medium of claim 14, wherein the decryption key is sent from the access control component to the guest operating system in response to disabling the identified input or output hardware component.

23. The computing system of claim 19, wherein the decryption key is sent from the access control component to the guest operating system in response to disabling the identified input or output hardware component.

* * * * *